US005172323A

United States Patent [19]
Schmidt

[11] Patent Number: 5,172,323
[45] Date of Patent: Dec. 15, 1992

[54] APPARATUS FOR DETERMINING THE ATTITUDE OF A VEHICLE

[75] Inventor: Raymond G. Schmidt, Yorba Linda, Calif.

[73] Assignee: The United States of America as represented by the Secretary of the Navy, Washington, D.C.

[21] Appl. No.: 804,627

[22] Filed: Dec. 6, 1991

Related U.S. Application Data

[63] Continuation of Ser. No. 369,896, Jun. 22, 1989, abandoned.

[51] Int. Cl.⁵ .............................................. G01C 21/00
[52] U.S. Cl. .............................. 364/453; 364/571.07; 33/328
[58] Field of Search ............. 364/570, 571.01, 571.02, 364/460, 449, 453, 580, 815, 731, 424.01, 424.02, 456, 816, 434, 571.07; 33/328; 73/178 R

[56] References Cited

U.S. PATENT DOCUMENTS

| | | | |
|---|---|---|---|
| 3,763,358 | 10/1973 | Cargille | 364/731 |
| 4,047,014 | 9/1977 | Morrison et al. | 364/816 |
| 4,134,681 | 1/1979 | Elmer | 364/456 |
| 4,212,443 | 7/1980 | Duncan et al. | 364/453 |

OTHER PUBLICATIONS

Davis et al.; Introduction to Vector Analysis; 1979; pp. 258-263, 296.

Primary Examiner—Parshotam S. Lall
Assistant Examiner—Michael Zanelli
Attorney, Agent, or Firm—John Tarlano

[57] ABSTRACT

A method of automatically determining attitude of a moving vehicle. Acceleration of the moving vehicle is measured with gyro stabilized accelerometers. The measurement is converted to a motion related vector in a first frame of reference. The coordinates are read into a computer. The cosine value and the sine value for an Euler rotation of the first frame of reference are read into the computer. The computer produces coordinates of the vector in a rotated frame of reference. The above two steps are repeated a number of times to arrive at a final frame of reference. The attitude of the vehicle is provided with respect to a final frame of reference with the aid of final produced coordinates.

1 Claim, 12 Drawing Sheets

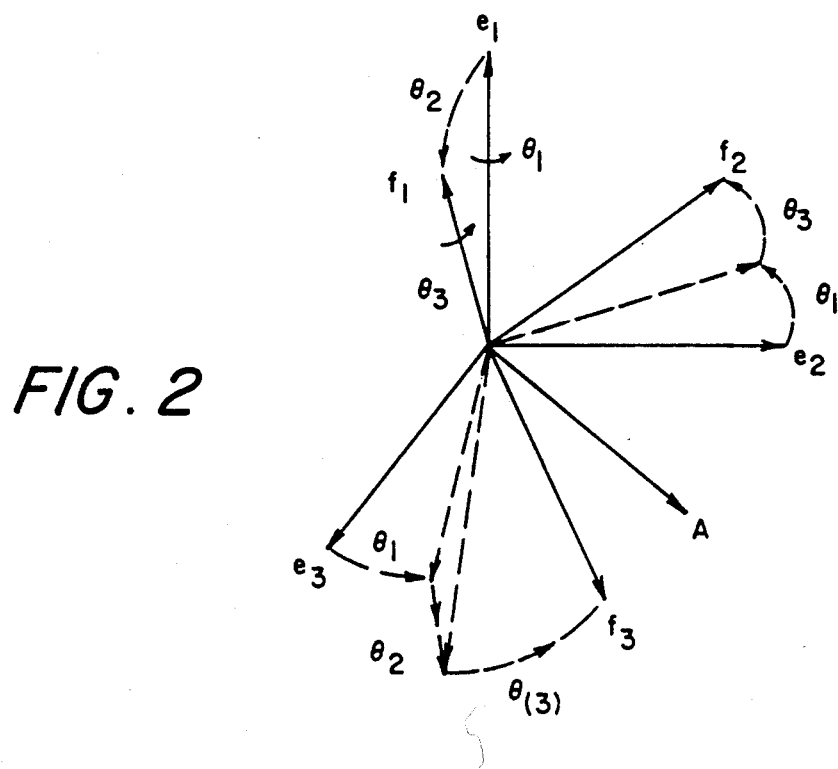

FIG. 2

$$\begin{vmatrix} B(1) \\ B(2) \\ B(3) \end{vmatrix} = \begin{vmatrix} 1 & 0 & 0 \\ 0 & \cos\theta_1 & \sin\theta_1 \\ 0 & -\sin\theta_1 & \cos\theta_1 \end{vmatrix} \begin{vmatrix} A(1) \\ A(2) \\ A(3) \end{vmatrix}$$

$$\begin{vmatrix} C(1) \\ C(2) \\ C(3) \end{vmatrix} = \begin{vmatrix} \cos\theta_2 & 0 & -\sin\theta_2 \\ 0 & 1 & 0 \\ \sin\theta_2 & 0 & \cos\theta_2 \end{vmatrix} \begin{vmatrix} B(1) \\ B(2) \\ B(3) \end{vmatrix}$$

$$\begin{vmatrix} D(1) \\ D(2) \\ D(3) \end{vmatrix} = \begin{vmatrix} \cos\theta_3 & \sin\theta_3 & 0 \\ -\sin\theta_3 & \cos\theta_3 & 0 \\ 0 & 0 & 1 \end{vmatrix} \begin{vmatrix} C(1) \\ C(2) \\ C(3) \end{vmatrix}$$

FIG. 3

$$\begin{vmatrix} E(1) \\ E(2) \\ E(3) \end{vmatrix} = \begin{vmatrix} 1 & 0 & 0 \\ 0 & \cos\theta_4 & \sin\theta_4 \\ 0 & -\sin\theta_4 & \cos\theta_4 \end{vmatrix} \begin{vmatrix} D(1) \\ D(2) \\ D(3) \end{vmatrix}$$

$$\begin{vmatrix} F(1) \\ F(2) \\ F(3) \end{vmatrix} = \begin{vmatrix} \cos\theta_5 & 0 & -\sin\theta_5 \\ 0 & 1 & 0 \\ \sin\theta_5 & 0 & \cos\theta_5 \end{vmatrix} \begin{vmatrix} E(1) \\ E(2) \\ E(3) \end{vmatrix}$$

$$\begin{vmatrix} G(1) \\ G(2) \\ G(3) \end{vmatrix} = \begin{vmatrix} \cos\theta_6 & \sin\theta_6 & 0 \\ -\sin\theta_6 & \cos\theta_6 & 0 \\ 0 & 0 & 1 \end{vmatrix} \begin{vmatrix} F(1) \\ F(2) \\ F(3) \end{vmatrix}$$

*FIG. 4*

| i | j | k | | | | |
|---|---|---|---|---|---|---|
| 1 | 2 | 3 | positive | rotation | about | 1-axis |
| 2 | 3 | 1 | " | " | " | 2-axis |
| 3 | 1 | 2 | " | " | " | 3-axis |
| 1 | 3 | 2 | negative | rotation | about | 1-axis |
| 2 | 1 | 3 | " | " | " | 2-axis |
| 3 | 2 | 1 | " | " | " | 3-axis |

*FIG. 6*

| I | CTAB(I) | STAB(I) | JTAB(I) | KTAB(I) |
|---|---|---|---|---|
| 1 | value of: cos $\theta_1$ | value of: sin $\theta_1$ | 2 * | 3 * |
| 2 | value of: cos $\theta_2$ | value of: sin $\theta_2$ | 3 | 1 |
| 3 | cos $\theta_3$ | sin $\theta_3$ | 1 | 2 |
| 4 | cos $\theta_4$ | sin $\theta_4$ | 2 | 3 |
| N | value of: cos $\theta_N$ | value of: sin $\theta_N$ | 1 * | 2 * |
| ⋮ | ⋮ | ⋮ | ⋮ | ⋮ |
| I END | cos $\theta_{IEND}$ | sin $\theta_{IEND}$ | 3 * | 1 * |

* FOR EXAMPLE, (J,K) DEFINES (2,3) = positive rotation about x
(3,2) = negative rotation about x
(3,1) = positive rotation about y
(1,3) = negative rotation about y
(1,2) = positive rotation about z
(2,1) = negative rotation about z

| N | ANGLE | DESCRIPTION | CTAB(N) | STAB(N) | JTAB(N) | KTAB(N) |
|---|---|---|---|---|---|---|
| 1 | $\vartheta_{brg}$ | Ship's relative bearing | $C_{brg}$ | $S_{brg}$ | 1 | 2 |
| 2 | $\vartheta_{pit}$ | Ship's pitch | $C_{pit}$ | $S_{pit}$ | 1 | 3 |
| 3 | $\vartheta_{rol}$ | Ship's roll | $C_{rol}$ | $S_{rol}$ | 3 | 2 |
| 4 | $\vartheta_{mmp}$ | Pitch mismount | $C_{mmp}$ | $S_{mmp}$ | 3 | 1 |
| 5 | $\vartheta_{mmh}$ | Heading mismount | $C_{mmh}$ | $S_{mmh}$ | 1 | 2 |
| 6 | $\vartheta_{rr1}$ | Biased resolver readout no. 1 | $C_{rr1}$ | $S_{rr1}$ | 2 | 3 |
| 7 | $\vartheta_{rr2}$ | Biased resolver readout no. 2 | $C_{rr2}$ | $S_{rr2}$ | 3 | 1 |
| 8 | $\vartheta_{rr3}$ | Biased resolver readout no. 3 | $C_{rr3}$ | $S_{rr3}$ | 1 | 2 |
| 9 | $\vartheta_{rr4}$ | Biased resolver readout no. 4 | $C_{rr4}$ | $S_{rr4}$ | 2 | 3 |
| 10 | flip | Coordinate axes 'flip' | 0.0 | 1.0 | 3 | 1 |
| 11 | flop | Coordinate axes 'flop' | 0.0 | 1.0 | 1 | 2 |

NAV ⇐ (rows 1–3)
SHIP ⇐ (rows 4–...)

FIG. 9B

| | | | | | | |
|---|---|---|---|---|---|---|
| 12 | $\vartheta_{tex}$ | Table error about x | $C_{tex}$ | $S_{tex}$ | 2 | 3 |
| 13 | $\vartheta_{tey}$ | Table error about y | $C_{tey}$ | $S_{tey}$ | 3 | 1 |
| 14 | $\vartheta_{pkx}$ | Pickoff error about x | $C_{pkx}$ | $S_{pkx}$ | 2 | 3 |
| 15 | $\vartheta_{pky}$ | Pickoff error about y | $C_{pky}$ | $S_{pky}$ | 3 | 1 |
| 16 | $\vartheta_{pkz}$ | Pickoff error about z | $C_{pkz}$ | $S_{pkz}$ | 1 | 2 |
| 17 | $\vartheta_{fle}$ | Equatorial gyro flip angle | $C_{fle}$ | $S_{fle}$ | 1 | 2 |
| 18 | $\vartheta_{flp}$ | Polar gyro flip angle | $C_{flp}$ | $S_{flp}$ | 3 | 1 |
| 19 | $\vartheta_{gy1}$ | Gyro attitude angle no. 1 | $C_{gy1}$ | $S_{gy1}$ | 1 | 2 |
| 20 | $\vartheta_{gy2}$ | Gyro attitude angle no. 2 | $C_{gy2}$ | $S_{gy2}$ | 2 | 3 |
| 21 | $\vartheta_{gy3}$ | Gyro attitude angle no. 3 | $C_{gy3}$ | $S_{gy3}$ | 3 | 1 |
| 22 | $\vartheta_{gye}$ | Gyro equatorial mode angle | $C_{gye}$ | $S_{gye}$ | 1 | 2 |
| 23 | $\vartheta_{rag}$ | Right ascension of Greenwich | $C_{rag}$ | $S_{rag}$ | 2 | 3 |
| 24 | $\vartheta_{pol}$ | Polar mode angle | $C_{pol}$ | $S_{pol}$ | 3 | 1 |
| 25 | $\vartheta_{lon}$ | Longitude | $C_{lon}$ | $S_{lon}$ | 2 | 3 |
| 26 | $\vartheta_{lat}$ | Latitude | $C_{lat}$ | $S_{lat}$ | 1 | 3 |
| 27 | $\vartheta_{azm}$ | Azimuth of Nav frame | $C_{azm}$ | $S_{azm}$ | 1 | 2 |

Groupings: 12–13 TABLE; 14–18 SPIN; 19–22 SPACE; 23–24 EARTH; 25–27 NAV

APPARATUS FOR DETERMINING THE ATTITUDE OF A VEHICLE

This is a continuation of application Ser. No. 369,896 filed 22 June 1989, now abandoned.

BACKGROUND OF THE INVENTION

In the past it has been necessary to use a single large conversion matrix to convert from a first frame of reference of a gyro assembly to another frame of reference, for the gyro assembly. Such a prior art method is quite cumbersome and is not amenable to programming on a computer.

The present invention allows one to program a computer in order to convert between non-adjacent frames of reference for a gyro assembly. An acceleration vector with respect to a first frame of reference is converted to an acceleration vector with respect to a second frame of reference. Step wise conversion is continued in order to go from the second frame of reference to a third frame of reference. Such stepwise conversion can be continued to go to a fourth frame of reference, and on to other frames of reference.

The method is based on Euler transformation technique. However, Euler showed only a conversion between two adjacent frames of reference. He did not suggest using the technique to make successive conversions between non-adjacent frames of reference.

Thus in the disclosed method, if one is going from a first frame of reference to a fourth frame of reference, one would use total of nine single axis rotation steps. Three steps would be used in going from the first frame of reference to a second frame of reference. Three steps would be used in going from the second frame of reference to the third frame of reference. Three steps would also be used in going from the third frame of reference to the fourth frame of reference. These nine steps are more easily programmed into a computer than would be three large conversion matrix multiplications, to go from the first frame of reference to the fourth frame of reference.

In the past it was commonly considered necessary to represent the transformation between a given reference frame and another, whose angular rate with respect to the first was known, by a direction cosine matrix, in order to ensure complete freedom of motion of the moving frame. While the direction cosine approach is a valid solution to the transformation problem, there are applications where it becomes burdensome.

One such application involves the use of inertially stabilized autonavigators. In this application, the navigator has its instruments mounted on a stabilized table attached to a vehicle by a four gimbal system whose angles can be read by means of resolvers or other angle readout devices. These gimbals have measurable mismount and non-orthogonally errors which must be compensated to accurately ascertain the transformation between the vehicle frame and the instrument frame. Gyro pickoff angles are nulled to maintain the instrument table reasonably fixed with respect to inertial space but known error in the pickoff angles must be compensated to determine the transformation from the instrument frame to a frame determined by the gyro spin axes. The gyro spin axes also tend to "drift" with respect to inertial space and the transformation from the gyro frame to the inertial frame must be established during alignment and thereafter extrapolated using drift compensation rates. The earth rotates about its polar axis with respect to inertial space and the transformation between these frames is extrapolated with the known spin rate of the earth. Finally, a locally level coordinate frame with a known bearing with respect to North is defined. This frame has an angular rate with respect to the Earth which may be computed from the vehicle velocity with respect to the Earth which, in turn, is computed from inertial accelerations transformed to the locally level frame from the instrument frame where they are sensed by accelerators. A desired output of an autonavigator is usually the attitude of the vehicle expressed in the form of three successive single axis rotations simulating older earth stabilized autonavigators which delivered roll, pitch, and heading directly from the gimbal angle readouts. The cycle of transformations is now complete from vehicle frame to vehicle frame.

Using conventional techniques, the gyro to inertial transformation and the earth to locally level transformation is represented by direction cosine matrices and extrapolated accordingly. The vehicle to instrument table transformation is determined from small angle error compensations and the single axis gimbal angle rotations and converted to a direction cosine matrix. The instrument to gyro transformation is represented by a small angle direction cosine matrix and the inertial to earth transformation by a single axis rotations in the form of a direction cosine matrix. The transformation from the instrument table to the locally level frame is formed by multiplying the direction cosine matrices for instrument to gyro, gyro to inertial, inertial to earth, and earth to locally level. The transformation from vehicle to locally level is formed by multiplying the vehicle to instrument table direction cosine matrix times the instrument table to locally level direction cosine matrix and then extracting the vehicle's roll, pitch, and bearing. Latitude and longitude are extracted from the earth to locally level direction cosines. These processes are cumbersome and consume a great deal of processor throughput.

The method employed by the invention uses four single axis rotations to define both the earth to locally level transformation and the gyro to inertial transformation.

The need for direction cosine matrices is, of course, contradicted by the use of four gimbals on a stabilized instrument table in order to ensure the same end. Leonard Euler (1707-1783) pointed out that any transformation between two coordinate frames can be represented by a series of three single axis rotations. This ignores the rate problems which arise when attempting to build the physical analog of the transformation, the three gimbal structure. The use of the four gimbal structure was the physical solution to the rate problem. The use of four single axis rotations is the solution to representing the transformation between the two coordinate frames discussed above. One of the four angles is designated the "redundant" angle and assumes two states, usually zero and ninety arcdeg. Judiciously "flipping" from one state to the other can resolve the rate problem.

The small angle compensation terms are represented by sequential single axis small angle rotations. The gimbal axis readouts already are single axis rotations. The complete cycle of transformations, therefore, from vehicle to instrument table to gyro to inertial to earth to locally level and finally back to vehicle though roll, pitch, and heading is defined as one continuous sequence of single axis rotations. A single computational entity (or subroutine) may be used to transform any desired vector from any coordinate frame to any other coordinate frame by successive single axis rotations. Furthermore, the latitude and longitude are directly extrapolated except when in polar regions when the desired transverse latitude and longitude replace them. Roll and pitch are computed by transforming the vertical vector (which is a coordinate axis) from the locally level coordinate frame to the vehicle frame in the inverse order where roll and pitch may be extracted. Heading is calculated by transforming the vehicle roll axis (also a coordinate axis) from the vehicle frame to the locally level frame where bearing is extracted and added to the directly extrapolated bearing of the locally level frame to form heading or transverse heading. This solution has been demonstrated in practice to offer large improvements in processor throughput and to also lend itself to clarity in exposition of the autonavigators mechanization equations.

The technique also makes use of certain properties of single axis rotations which allow the rotation to be specified by the names of the axes whose components will undergo change. Furthermore, the order in which the axes are specified allow the rotation to be either positive or negative and interchanging the order of axis specification allows the inverse rotation to be defined. These properties allow a single subroutine to be used to transform vectors from one coordinate frame to another when coupled with a simple table defining the single axis rotations and containing the sine and cosine of each rotation. The sine and cosine of each angle may be calculated at whatever rate is appropriate to that rotation.

The technique also includes simple techniques for the solution of single axis rotation angles which can be derived from known rotation angles.

The Euler-Angle Technique consists of the following combinations of facts used to form a single unified technique in the handling of complex coordinate transformation problems.

1. All transformations may be expressed by at most four properly ordered single axis rotations.
2. A single subroutine may be used to transform any vector from one coordinated frame to another.
3. A table defining the rotations and including the sines and cosines of the rotation angles is the core of the technique.
4. The sines and cosines of the rotation angles may be updated independently at whatever rate is appropriate to the accuracy of the solution.
5. Up to three unknown angles in a cycle of rotations may be easily determined if the others are known.

DESCRIPTION OF THE DRAWING

FIG. 2 is a diagram of three Euler angle rotations used in going from a first gyro frame of reference of FIG. 1 to a second vehicle frame of reference of FIG. 1.

FIG. 3 is a set of three matrices used in mathematically expressing the three Euler angle rotations of FIG. 1.

FIG. 4 is a set of three matrices used in mathematically expressing three Euler angle rotations used in going from the second vehicle frame of reference of FIG. 1 to the third earth frame of reference of FIG. 1.

FIG. 6 is a list of sets of values of I, J and K that are used in the algorithm of FIG. 5, to effect various positive and negative Euler rotations around three mutually orthogonal axes.

FIG. 7 is a diagram of an input value for each of CTAB, STAB, JTAB and KTAB, for use by the computer program used for FIG. 5, as I advances in value from 1 to a final end value of I, in the computer program.

FIGS. 9A and 9B, taken together are a diagram of an input value for each of CTAB, STAB JTAB and KTAB for use by the computer used for FIG. 10.

DESCRIPTION OF THE PREFERRED EMBODIMENT

Figure 1:
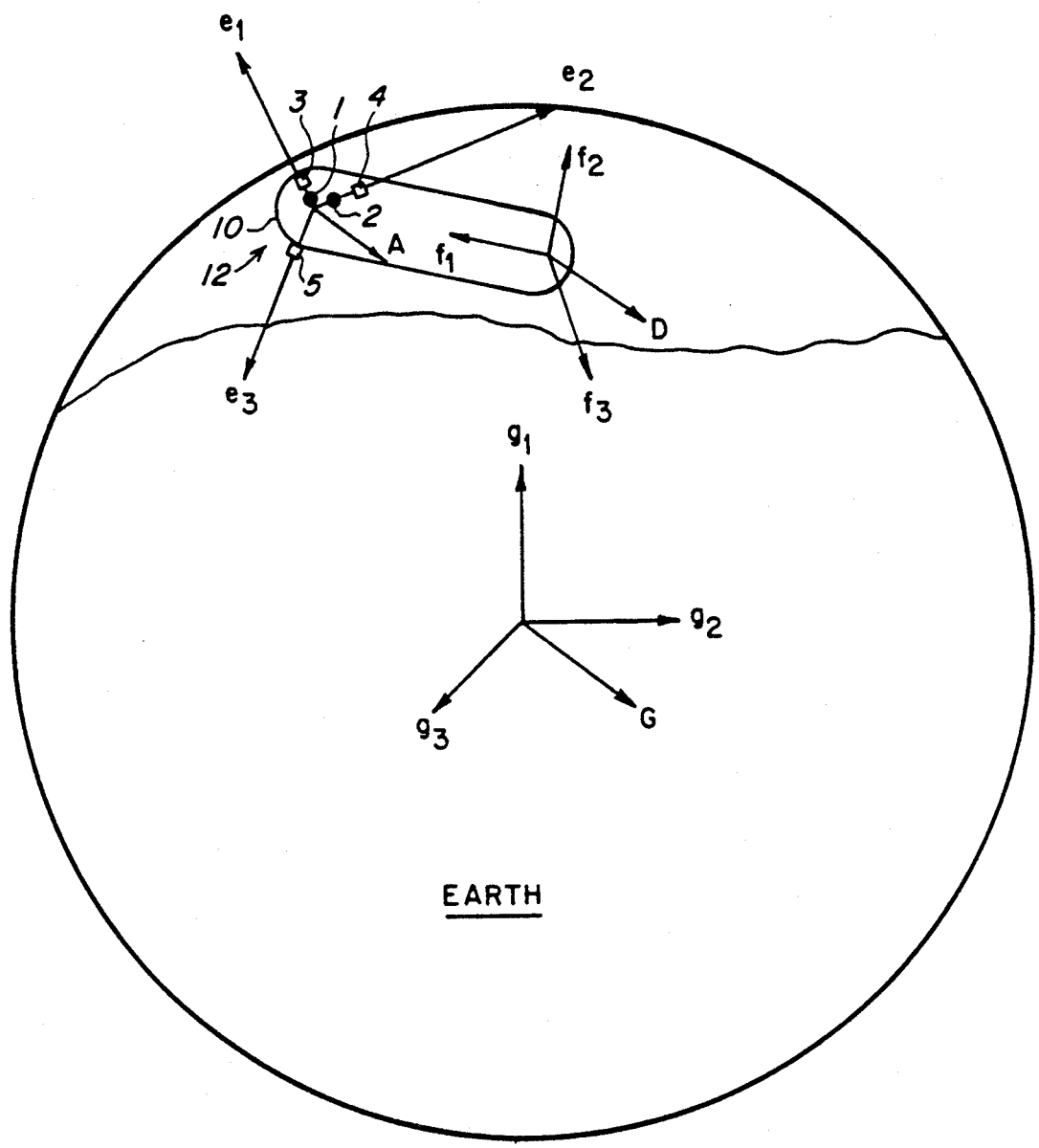
FIG. 1 is a side diagrammatic view of a vehicle that senses an acceleration vector in a first gyro frame of reference and shows that vector in a second vehicle frame of reference and in a third earth frame of reference.

FIG. 1 shows a submarine 10 and a space-stabilized gyro 12. The gyro system frame of reference is determined by the spin axes of two electrostatically suspended gyros 1 and 2. accelerometers 3, 4 and 5, are mounted on coordinate axes, e1, e2 and e3, respectively, of this first frame of reference.

FIG. 1 shows the first frame of reference e1, e2 and e3 of the gyro system 12. FIG. 1 shows an acceleration vector, A, of the submarine in the first frame of reference of the gyro system. The acceleration vector, A, is sensed by accelerometers 3, 4 and 5.

FIG. 1 shows a second frame of reference f1, f2, and f3. This is the frame of reference of submarine 10. FIG. 1 shows an acceleration vector, D, of the submarine in the second frame of reference.

FIG. 1 also shows a third frame of reference g1, g2 and g3. This is the frame of reference of the earth. FIG. 1 shows the acceleration vector, G, of the submarine in the third frame of reference.

FIG. 2 shows a set of Euler-angle transformations needed to go from an inertial reference frame having axes e1, e2 and e3 to an inertial reference frame having axes f1, f2 and f3.

The first frame of reference may be that of an acceleration vector sensed by accelerometers on a gyro assembly, with respect to the gyro assembly. The second frame of reference may be that of the gyro assembly with respect to the frame of reference of a ship. A third frame of reference may be the ship with respect to the earth.

As seen from FIG. 1, three rotations are needed to align the axes of the first frame on the three axes of the second frame.

A vector (a) in the first reference frame may be expressed as $$A = \begin{matrix} A(1) \\ A(2) \\ A(3) \end{matrix}$$

The vector A may be an acceleration vector relative to a space stabilized gyro system. The same vector may be expressed in second reference frame as $$D = \begin{matrix} D(1) \\ D(2) \\ D(3) \end{matrix}$$

The vector D may be an acceleration vector of a ship, on which the space stabilized gyro system 12 is place. The gyro system 12 will move on gimbals relative to the ship.

The matrix transformations necessary to convert a vector A in the first reference frame into a vector B in the second reference frame are expressed below. Three rotations $\theta 1$, $\theta 2$ and $\theta 3$ are needed to go from the first frame of reference into the second frame of reference. They are shown in FIG. 2. Three conversion matrices for the three rotational angles $\theta 1$, $\theta 2$ and $\theta 3$ are necessary to mathematically convert vector A to vector D. The matrices are shown in FIG. 3.

The matrices of FIG. (3) for 1 reference frame transformation may be expressed as the three related sets of equations, given below:

$B(1)=A(1)$ $B(2)=A(2) \cos \theta(1)+A(3) \sin \theta(1)$ $B(3)=A(3) \cos \theta(1)-A(2) \sin \theta(1)$ $C(2)=B(2)$ $C(3)=B(3) \cos \theta(2)+B(1) \sin \theta(2)$ and $C(1)=B(1) \cos \theta(2)-B(3) \sin \theta(2)$ $D(3)=C(3)$ $D(1)=C(1) \cos \theta(3)+C(2) \sin \theta(3)$ $D(2)=C(2) \cos \theta(3)-C(1) \sin \theta(3)$ It is noted that the three above sets of equations have a common form. This common form may be used as a basis of a computer program to make stepwise transformations. Such stepwise transformations are used to make a conversion from the first frame of FIG. 1 to the second frame of FIG. 1.

One may then convert to a third reference frame having axes g1, g2 and g3. If the rotational angles between reference frame f1, f2 and f3 and g1, g1 and g3 are $\theta 4$, $\theta 5$, and $\theta 6$, the above form of transformation matrices may be repeated. The same vector D may be express in this new reference frame as vector G. The conversion matrices, to go from the expression of the vector D in the second reference frame f1, f2, f3, to the vector G in the third reference frame g1, g2, and g3, are given in FIG. 4.

The above conversion process may be repeated depending on the number of coordinate system conversions that are needed in order to go from a first coordinate system to a last coordinate system.

It is seen that the same three matrix forms are used in converting a vector in one frame of reference into a vector in another frame of reference. The same three matrix forms are used to make three Euler angle rotations from the one frame of reference to another frame of reference. In view of the commonality of these three matrix forms, one may use a computer program in going from a first frame of reference to a second, third, fourth, etc. frame of reference.

Figure 5:
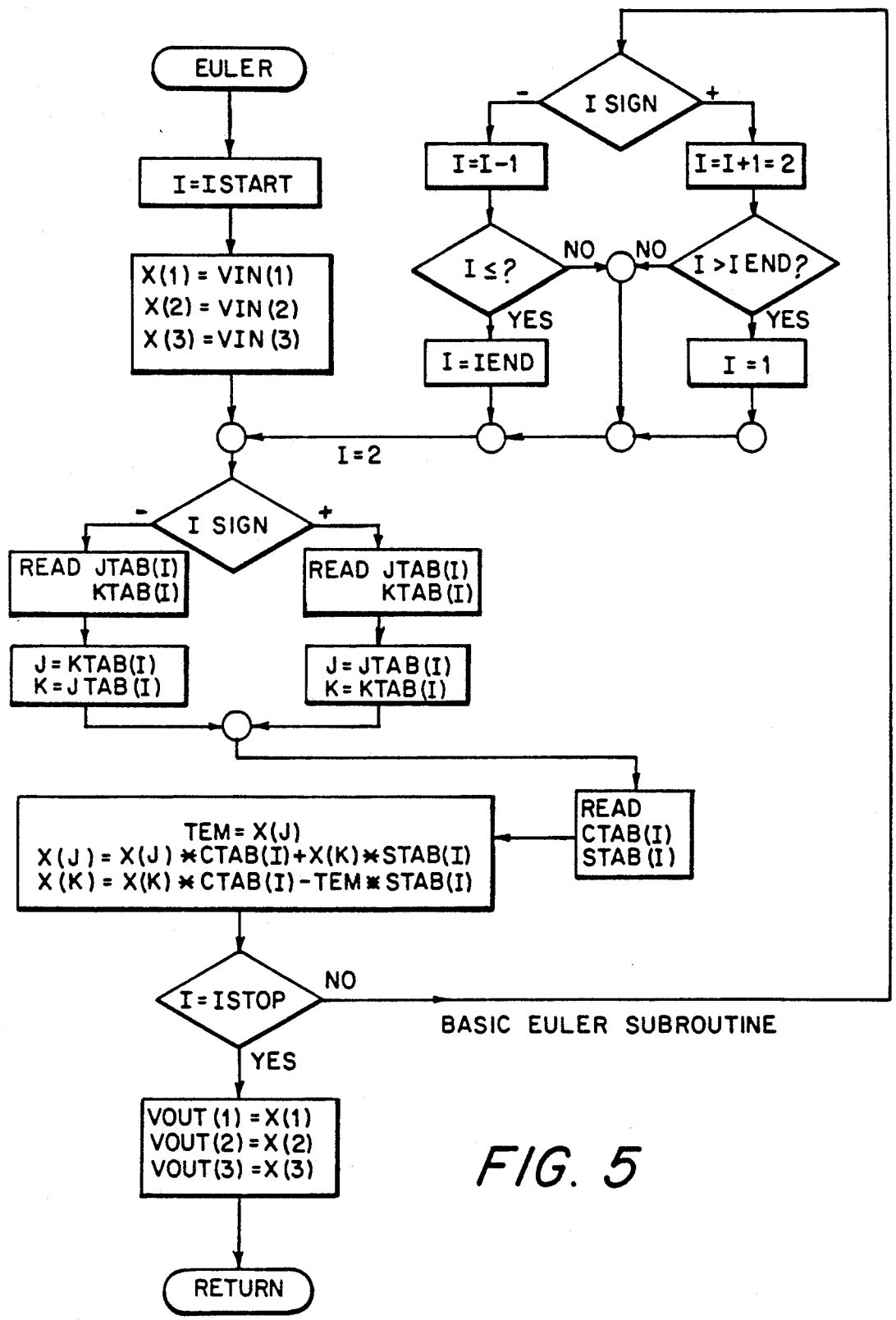
FIG. 5 is a presentation of a flow diagram of a computer program that uses the method of the present invention.

FIG. 5 shows a flow diagram for a computer program that is used to carry out the above described matrix conversions on a computer. In FIG. 5 the program shows the coordinates X(1), X(2) and X(3) of a vector A, in a first coordinate system, being used by the program. The sine value and cosine value of the three rotation angles, used for three rotations in going between frames of reference, are also used in the computer program. The sine value of a first rotation angle, for each rotation, is read into the program from a table such as the table of FIG. 7. The cosine value of a first rotation angle is also read from such a table.

For instance if a vector A in a first frame of reference were to be converted into a vector J in a fourth frame of reference, the computer reads the three vector values X(1), X(2) and X(3), on the axes of the first frame into the computer program. The computer also reads the sine and cosine values of the Euler rotation angle $\theta 1$ for the first rotation into the computer program. After a computer calculation the resultant values are used in a next computer calculation according to the order showing in the table of FIG. 7. The sine and cosine values for the rotation angle for the next rotation are also read by the computer from a table such as the table of FIG. 7.

The computer program would go through nine computer calculations corresponding to nine rotations. It would then read out the three values X(1), X(2) and X(2) of vector J. These three values would be along the axes of the fourth frame of reference.

Again, since a number of orthogonal axes conversions may be written as the result of an equal number of at least three single-axis (Euler) rotations, then any sequence of orthogonal transformations may be written as a sequence of single-axis rotations. Since a rotation of the vector, (X1), X(2), X(3) to an intermediate vector X(1), X(2), (X3) occurs by rotating through an angle $\theta(I)$, about the i-axis, the rotation calculation may be written,

TEM=X(J)

X(J)=X(J) * CTAB(I)+X(K) * STAB(I)

X(K)=X(K) * CTAB(I)−TEM * STAB (I)

* is a symbol for the multiplication function. It is noted that the value of either X(1) or X(2) or X(3) is the same both before and after the rotation calculation. Therefore one may read out the same value of either X(1), X2 or X(3), that is read into the computer program.

The table of FIG. 6 defines the possible index states. several transformations may be defined by a list of sines and cosines of rotation angles and their associated J and K-indices.

After the rotation calculation, the values of X(1), X(2) and X(3) are read out, stored, and read into the above Fortran equations. The next rotation calculation can then be carried out.

The disclosed Euler Angle Technique uses a subroutine, which in FORTRAN has the calling format,

CALL EULER (VIN, VOUT, ISTART, ISTOP, ISIGN),

WHERE,

VIN=input vector (3-state),

VOUT=output vector (3-state),

INSTART=first Euler angle transformation (1 thru IEND)

INSTOP=last Euler angle transformation (1 thru IEND)

ISIGN=direction in scanning table (+ = top to bottom of table).

It is assumed that an Euler Transformation Table is known globally to the program (including the subroutine). The table includes a cosine column (CTAB (I)), a sine column (STAB(I)), a J-index column (JTAB (I)), and a K-index column (KTAB (I)). The cosine and sine columns may be dynamically updated by the program at a rate commensurate with accuracy and band-width requirements. The index columns specify the axis and direction of the transformation and are constant.

FIG. 6 shows changes in the subscripts to be used in the set of equations above, for positive and negative rotations about the three Euler angles, in order to go from a first reference frame to a second reference frame. The subscripts of FIG. 6, in combination with the above set of equations, will produce the three matrix multiplications shown in FIG. 3. The first three rows of the table of FIG. 3 will be used since the equations of FIG. 3 are the result of positive (right hand) rotations around axes e1, e2, and e3 of FIG. 2. Axes e1, e2 and e3 correspond to the 1, 2 and 3 axes referred to in FIG. 6.

FIG. 7 shows a table of sines and cosines of the various Euler angles that are used in the computer program of FIG. 5, in going between frames of reference. For instance in going from a first frame of reference to a fourth frame of reference the sines and cosines of nine Euler angles would be included in the table of FIG. 7. The sine and cosine values would be used in the computer program of FIG. 5. The table of FIG. 7 also shows the JTAB and KTAB values to be used in the computer program of FIG. 5 for rotations around the Euler angles used in the table. The JTAB and KTAB values for rotations around the three Euler angles for a transformation from a first frame of reference to a second frame of reference are shown below the table of FIG. 7.

Using the Fortran equations above, a computer program for the first rotation as shown in FIG. 2, will take the following computer steps:

READ X(1), X(2), X(3)

I=1

READ JTAB(I), KTAB(I)

J=JTAB(I)

K=KTAB(I)

READ CTAB(I), STAB(I)

TEM=X(J)

X(J)=X(J) * CTAB(I)+X(K) * STAB(I)

X(K)=X(K) * CTAB(I)−TEM * STAB(I)

STORE X(1), X(2), X(3)

READ X(1), X(2), X(3)

Figure 8A:
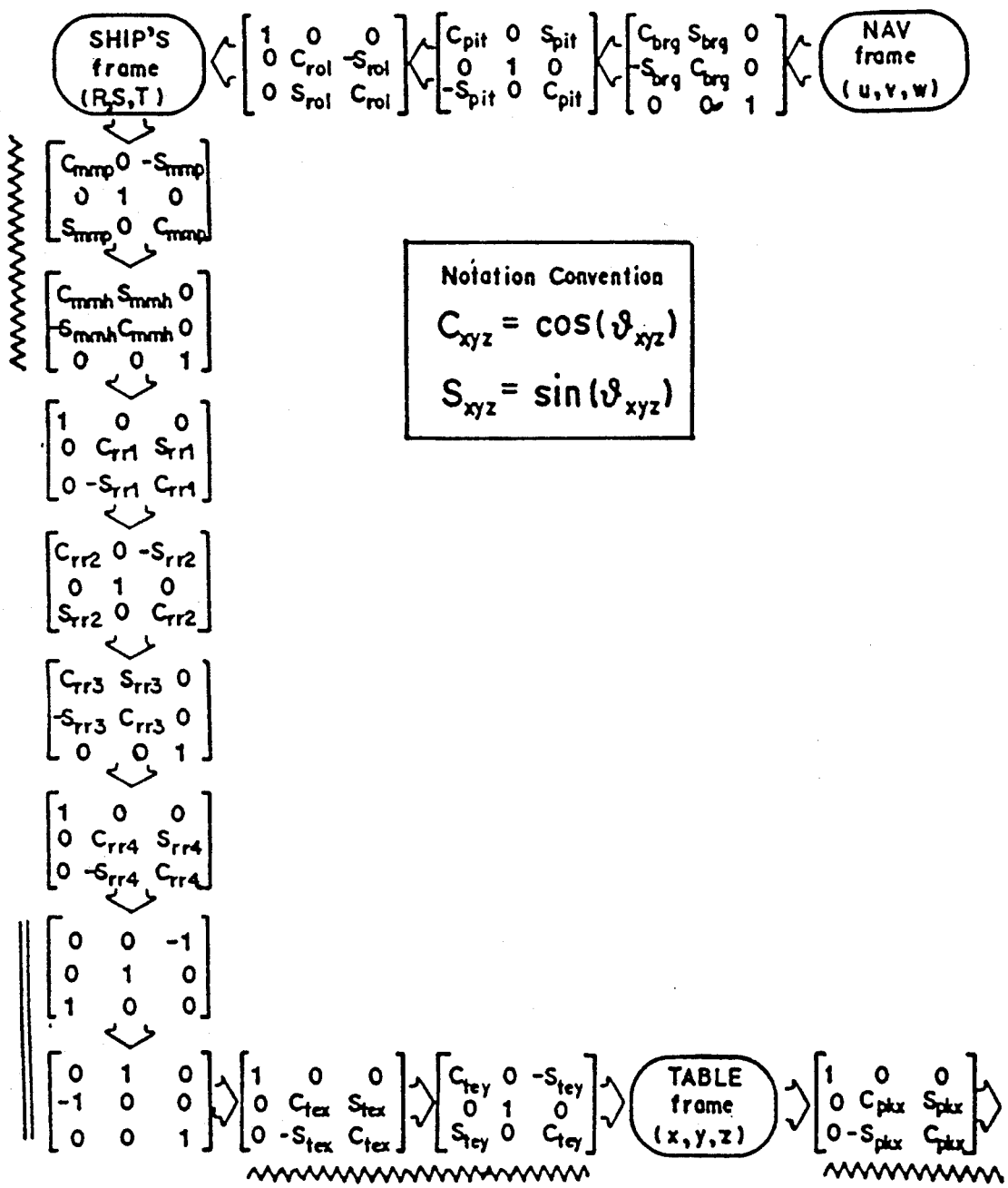
FIGS. 8A and 8B, taken together are a set of twenty seven matrices used in mathematically expressing twenty seven Euler angle rotations.
Figure 8B:
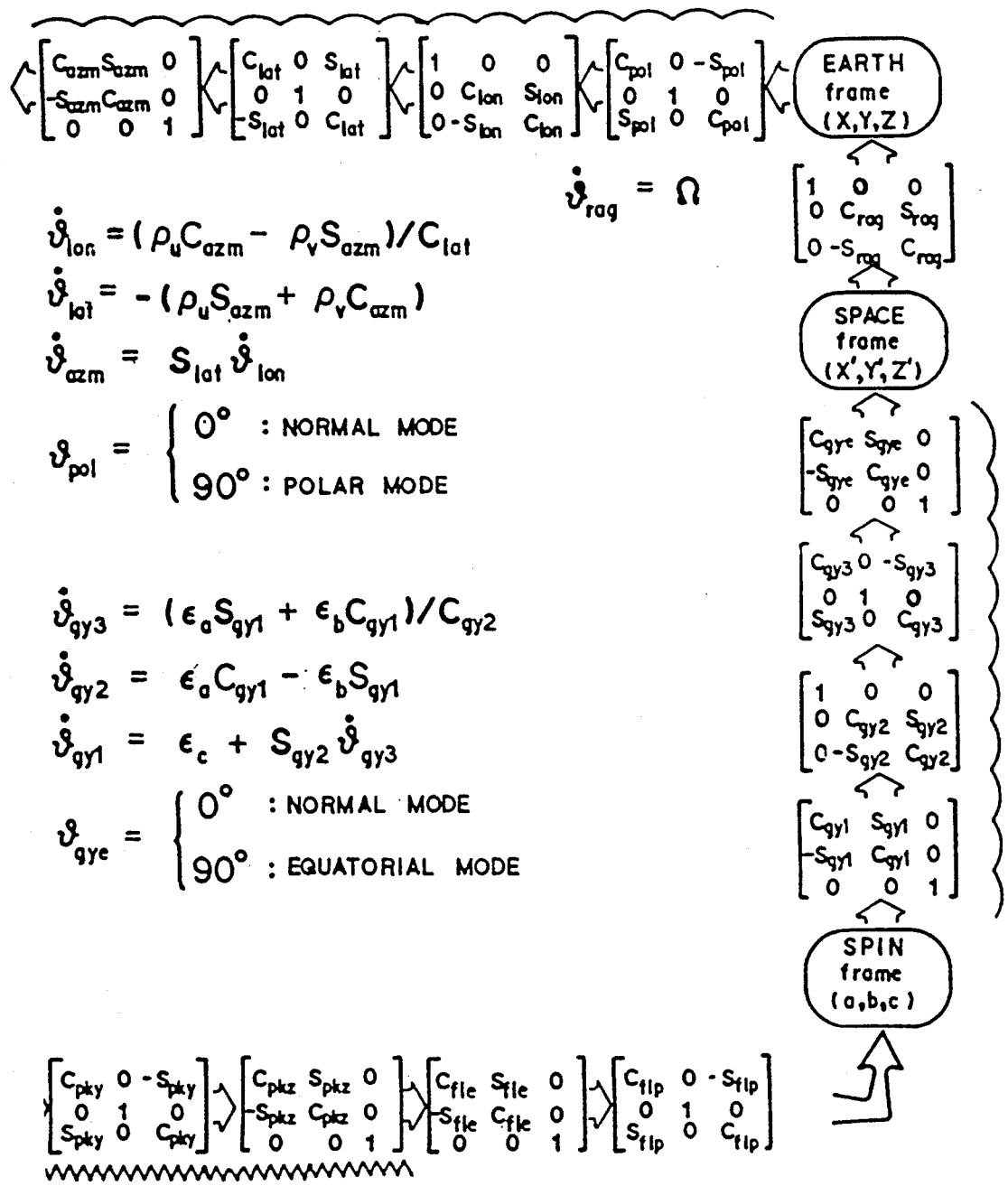
Figure 10A:
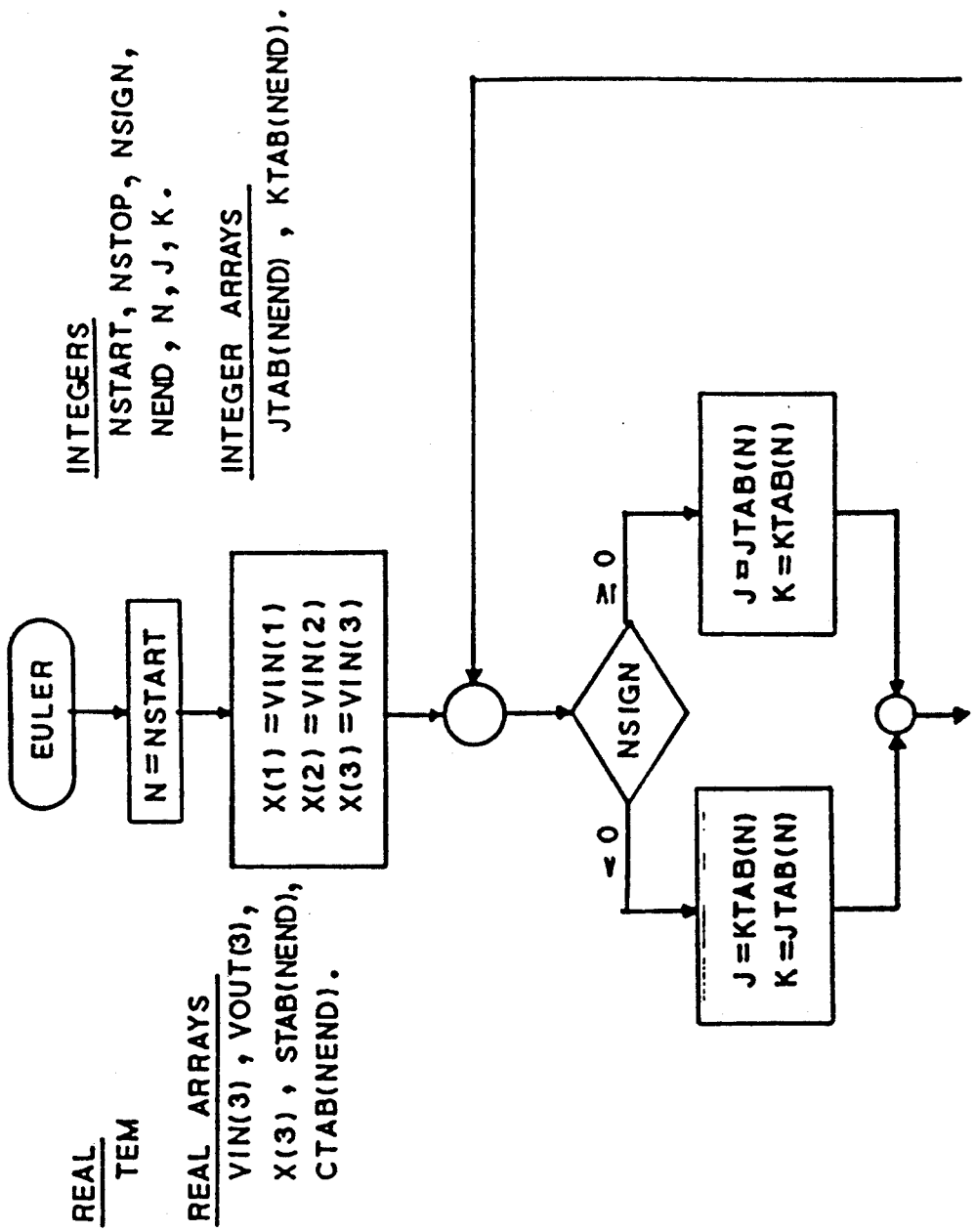
FIGS. 10A and 10B, taken together, are a flow diagram of a computer program that uses the method of the present invention.
Figure 10B:
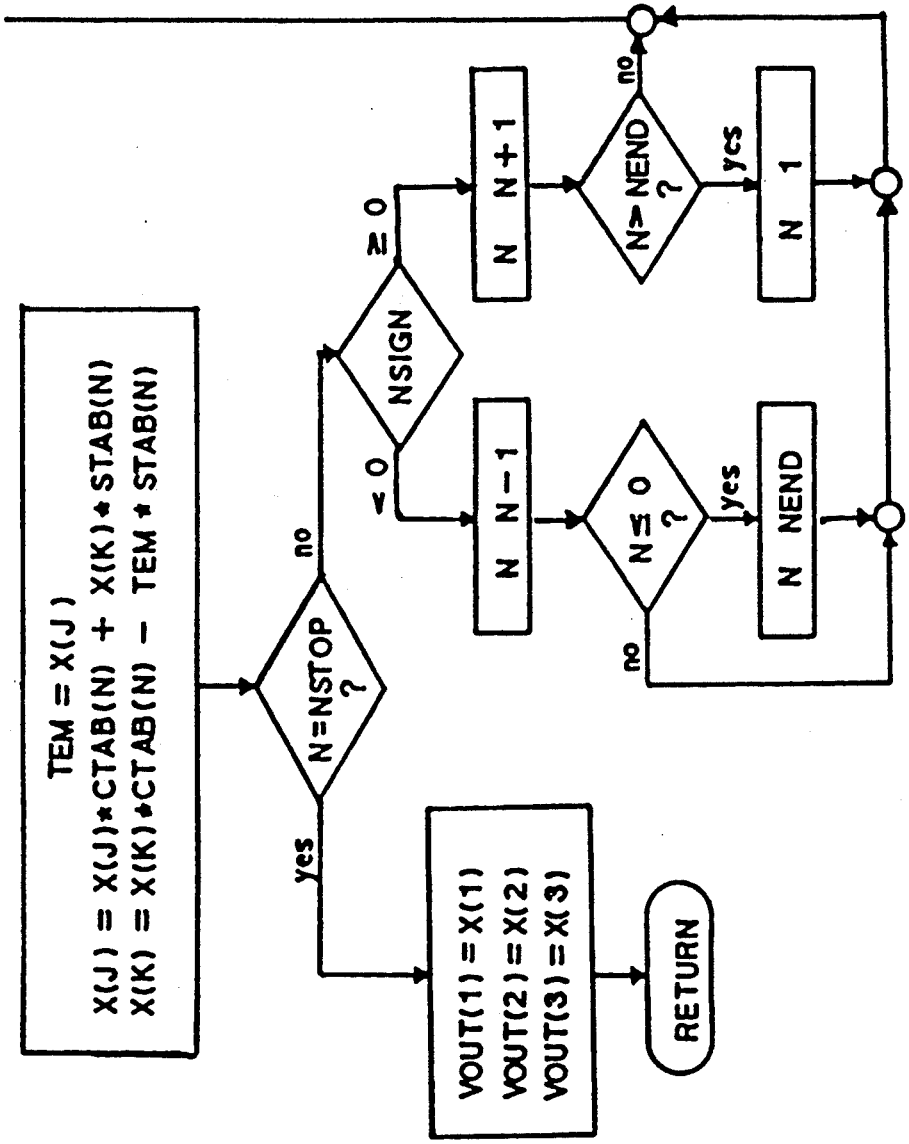

The technique is best described by the following detailed description. FIG. 8 shows coordinate frames and single axis rotations used in an autonavigator mechanization. FIG. 9 is an Euler Angle Table which is at the heart of the technique. The table is augmented with descriptive phrases. FIG. 10 more specifically shows an Euler Angle Subroutine in a FORTRAN format. The subroutine is used to effect all coordinate rotations. Each coordinate frame and each rotation that is used is described in order to show the use and power of the technique.

A. COORDINATE FRAMES USED

NAV FRAME—The NavFrame, (u,v,w), is a locally level coordinate frame with its w-axis down along the plumb bob vector. This frame is a wander azimuth frame by virtue of the fact that no angular rate with respect to the earth is applied about the w-axis. This causes the bearing or "azimuth" of this frame to wander with respect to North.

SHIP FRAME—The Ship Frame, (R,S,T,) has its R-axis forward along the longitudinal axis of the ship. The S-axis is out the port side of the ship and the T-axis is down toward the keel.

TABLE FRAME—The Table Frame, (x,y,z), is an arbitrarily defined right-handed frame fixed with respect to accelerometer input axes and to the electrostatically suspended gyro cases.

SPIN FRAME—The Spin Frame, (a,b,c), is defined by the Polar Gyro spin vector as the c-axis and the Equatorial Gyro spin vector cross product with the Polar Gyro spin vector laying along the a-axis. The Equatorial Gyro is lightly torqued to maintain orthogonality with the Polar Gyro so that the b-axis very nearly lies along the Equatorial Gyro spin vector.

SPACE FRAME—The Space Frame, (x', y', z'), is an inertially fixed frame with the x'-axis along the Earth's spin (polar) vector and the z'-axis pointing away from the First Line of Aries.

EARTH FRAME—The Earth Frame, (X,Y,Z), is an Earth fixed frame with the X-axis along the Earth's spin vector and the Z-axis away from the Prime Meridian.

B. FRAME TRANSFORMATIONS

NAV-TO-SHIP TRANSFORMATION—The Nav-to-Ship Transformation consists of the three single axis transformations shown in FIG. 8 of Relative Bearing Ship's Pitch and Ship's Roll. Since the ship has limited motion only the three angles are necessary. During normal operating modes, these angles are calculated from the others. During initialization modes these angles are known either from a master system or operator entered values at dockside.

Figure 11:
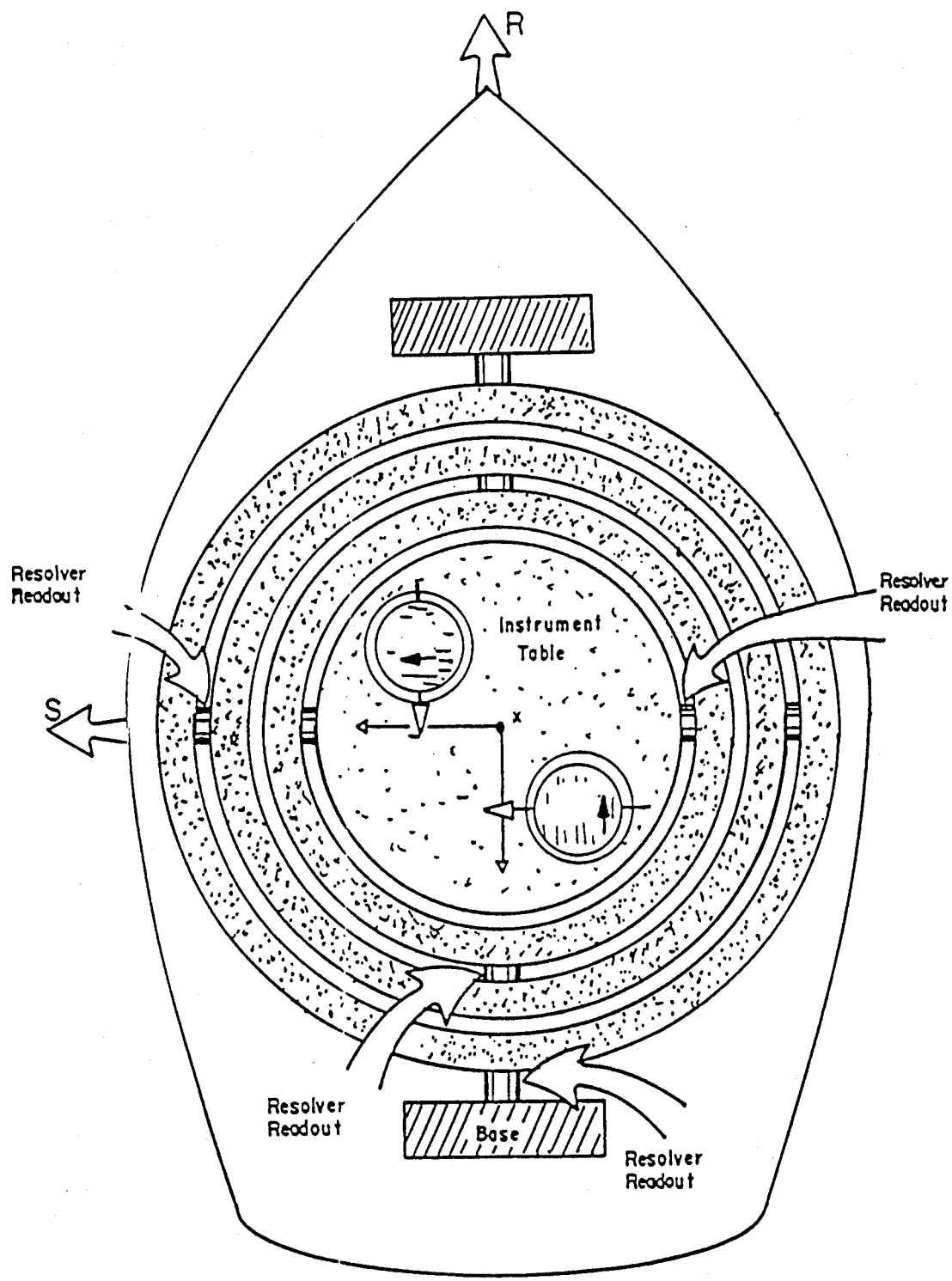
FIG. 11 is a diagramatic view of equipment used on a vehicle to sense a vector.

SHIP-TO-TABLE TRANSFORMATION—The primary reference for the Ship-to-Table Transformation are the four resolver readouts defined in FIG. 9 and show simplistically in FIG. 11. The numbers 3 angle is held to zero except when a gimbal "lock-up" is imminent when it is allowed to move. The mismount angles, (4 and 5), consist of calibrated mismount errors and gimbal non-orthogonally compensations transformed to the Ship Frame. The mysterious angles, "flip" and "flop" are a feature of the Euler Angle Technique. Since the Table Frame is defined arbitrarily the Ship Frame and the Table Frame are not coincident when all other angles are zeroed. The axis "flip-flop" repairs this deficiency without a complete renaming operation. Finally the Table Errors, (12 and 13), remove any residual calibrated table errors and gimbal non-orthogonally errors.

TABLE-TO-SPIN TRANSFORMATION—The Table-to-Spin Transformation is first defined by a small angle pickoff compensation. This compensation is transformed into three sequential angles in order to use the Euler Angle Technique. Compensation is applied to ensure that the three sequential angles are equivalent to the small angle matrix although the error is insignificant. The instrument table may be flipped about either the polar or gyro spin axis and restabilized with the spin vector of the other gyro at the opposite end of its case. The equatorial flip angle contains the estimated pickoff resolver angle for the equatorial gyro. The polar flip angle contains the estimated pickoff resolver angle for the polar gyro.

SPIN-IN-SPACE TRANSFORMATION—The Spin-to-Space Transformation makes use of the four Euler angle transformation theorem. Normally, the polar gyro is aligned along the Earth's polar axis and the equatorial gyro lies in the plane of the Earth's Equator so that the three gyro attitude angles would be adequate. During calibration, however, the gyros may be interchanged which still does not present a problem. However, it is necessary to place both spin vectors in the Equatorial plane for full calibration causing a computational gimbal rate problem. In this case the Gyro Equatorial Mode Angle is set to 90 arcdeg instead of the usual 0 arcdeg and the rate problem is resolved. In practice, the switch occurs when nearing the problem zone and the reverse switch is made when safely out of the problem zone with some computational hysteresis applied to prevent frequent switches.

SPACE-TO-EARTH TRANSFORMATION—The Space-to-Earth Transformation consists only of a rotation about the Earth's polar axis through the Right Ascencion of Greenwich.

EARTH-TO-NAV TRANSFORMATION—Finally the Earth-to-Nav Transformation consists of a sequence of four Euler angles. The Polar Mode Angle is normally set to zero so that the remaining angles are normal geometric longitude and latitude and the bearing of the Nav frame with respect to North. When operating near the Earth's poles it is necessary to set the Polar Mode Angle to 90 arcdeg. The latitude, longitude, and azimuth are now referenced to a coordinate frame with the Polar at the intersection of the Equator and the International Date Line. The "Prime Meridian" of this system passes through the North Pole. These are the commonly used Transverse Coordinates.

C. EXTRAPOLATION OF TRANSFORMATIONS

There are three transformations whose angular rates are known or estimated from which the transformation must be extrapolated. These are:

1. The Spin-to-Space Transformation—The gyro drive vector can be computed in the Spin-Frame and the differential equations of FIG. 1 are numerically solved. Note that the state of the Gyro Equatorial Mode Angle does not effect the equations.

2. The Space-to-Earth Transformation—The Right Ascencion Angle of Greenwich may be extrapolated from the rotation rate of the Earth.

3. The Earth-to-Nav Transformation—The Ship's velocity with respect to the Earth may be computed from sensed accelerations and damped using reference velocity sources. In turn using the Earth's known shape, the angular velocity of the plumb-bob vector may be determined with respect to the Earth. The angular rate about the plumb-bob vector is assumed to be zero to yield a wander azimuth frame. The extrapolation equations are shown in FIG. 1. Again note that the state of the Polar Mode Angle does not impact the extrapolation equations.

D. COMPUTATIONS USING THE EULER ANGLE SUBROUTINE

The power of the Euler Angle Technique will now be demonstrated by showing its use of selected computations, typical of the coordinate transformations, angle computations, and redundant angle flipping operations performed.

TRANFORM ACCELERATION TO NAV FRAME—Let the acceleration measured in the Table Frame be given by the vector,

[AT(1), AT(2), AT(3)], the acceleration in the Nav Frame is then given by the vector

[AN(1), AN(2), AN(3)], which is obtained by the subroutine call,

CALL EULER(AT, AN, 14, 27, 1)

COMPUTE ROLL, PITCH, AND HEADING—The ship's attitude is computed by defining the unit vectors,

XI = [1.0, 0.0, 0.0],

ZI = [0, 0.0.0,1.0], and the temporary vectors,

T1 = [T1(1), T1(2), T1(3)],

T2 = [T2(1), T2(2), T2(3)], and then performing the following computations,

CALL EULER (ZI,T1,27,4,−1)

CALL EULER (X1,T2,4,27,+1)

ROLL = ARCTANE−T1(2), T1(3)]

COSP = SQRT[T1(2)2+T1(3)2]

PITCH = ARCTAN [−T1(1), COSP]

BEARING = ARCTAN[T2(2),T2(1)]

HEADING = BEARING+AZIMUTH.

NORMAL-TO-POLAR TRANSITION—When, in the Normal Mode of the Earth-to-Nav Transformation extrapolation, the Polar operating zone is detected the following computations are performed,

CALL EULER (ZI, T1, 27, 24, −1)

CALL EULER (ZI, T2, 24, 27, +1)

AZIMUTH = ARCTAN[−T2(2),−T2(1)]

COSL = SQRT[T2(1)2 + T2(2)2]

LATITUDE = ARCTAN[T2(3), COSL]

LONGITUDE = ARCTAN[−T1(2),T1(1)]

POLAR MODE ANGLE = NINETY ARCDEG.

The present invention may be used to make conversions of any type of vector. The vector may be a motion related vector such as a velocity vector. The vector may be that obtained from any type of vehicle, such as an aircraft.

While the present invention has been disclosed in connection with the preferred embodiment thereof, it should be understood that there may be other embodiments which fall within the spirit and scope of the invention as defined by the following claims.

What is claimed is:

1. Apparatus for determining the attitude of a vehicle, comprising:

(a) an instrument table means for holding accelerometer means;

(b) gyro means for stabilizing the instrument table;

(c) gimbal means, having four gimbals, for rotationally holding the instrument table to the vehicle;

(d) resolver means having four resolvers, with each of the four resolvers separately attached to each of the four gimbals of the gimbal means, for sensing four Euler angle rotations, one Euler angle rotation being due to gimbal flipping, and three other Euler angle rotations being due to rotation of the vehicle relative to the instrument table;

(e) accelerometer means on the instrument table for measuring acceleration, associated with movement of the vehicle, in a first frame of reference;

(f) means for generating coordinate values of a motion vector, based on said measured acceleration, in the first frame of reference;

(g) computer means for determining coordinate values in a rotated frame of reference, comprising:

an Euler angles table means for holding information of the four Euler angle rotations sensed by the four resolvers, first means for reading coordinate values of the motion vector in the first frame of reference, second means for reading a cosine value and a sine value of an Euler angle for an Euler rotation, used in converting between the first frame of reference and a rotated frame of reference from the Euler angle table, and third means for performing a calculation on the coordinate values of the motion vector in the first frame of reference during movement of the vehicle, the third means programmed to operate under a computer program that contains an algorithm that uses the cosine value and the sine value, wherein coordinate values of the vector in the first frame of reference are expressed as X(I), X(J), and X(K), the cosine of the Euler angle is expressed as CTAB (I), the sine of the Euler angle is expressed as STAB(I), the algorithm has computer statements TEM = X(J), X(J) = X(J)*CTAB(I) + X(K)*STAB(I) and X(K) = X(K)*CTAB(I) − TEM*STAB(I), and the coordinate values of the motion vector after the calculation are expressed as X(I), X(J), and X(K), to produce coordinate values of the motion vector in a rotated frame of reference; and (h) means for determining the attitude of the vehicle with respect to the rotated frame of reference using the produced coordinate values of the motion vector in the rotated frame of reference.

* * * * *